United States Patent Office 3,061,415
Patented Oct. 30, 1962

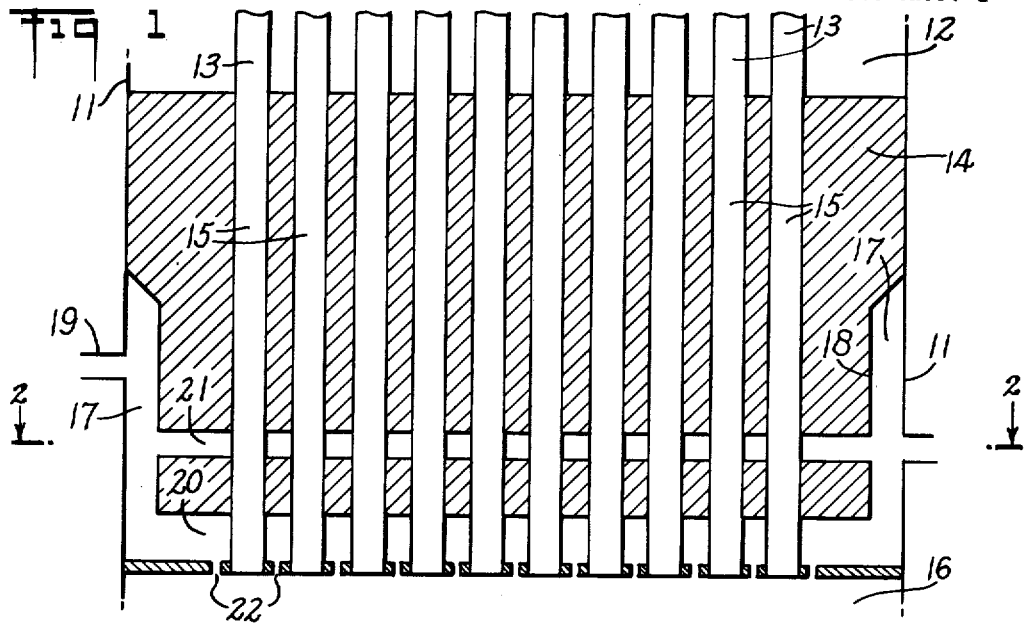
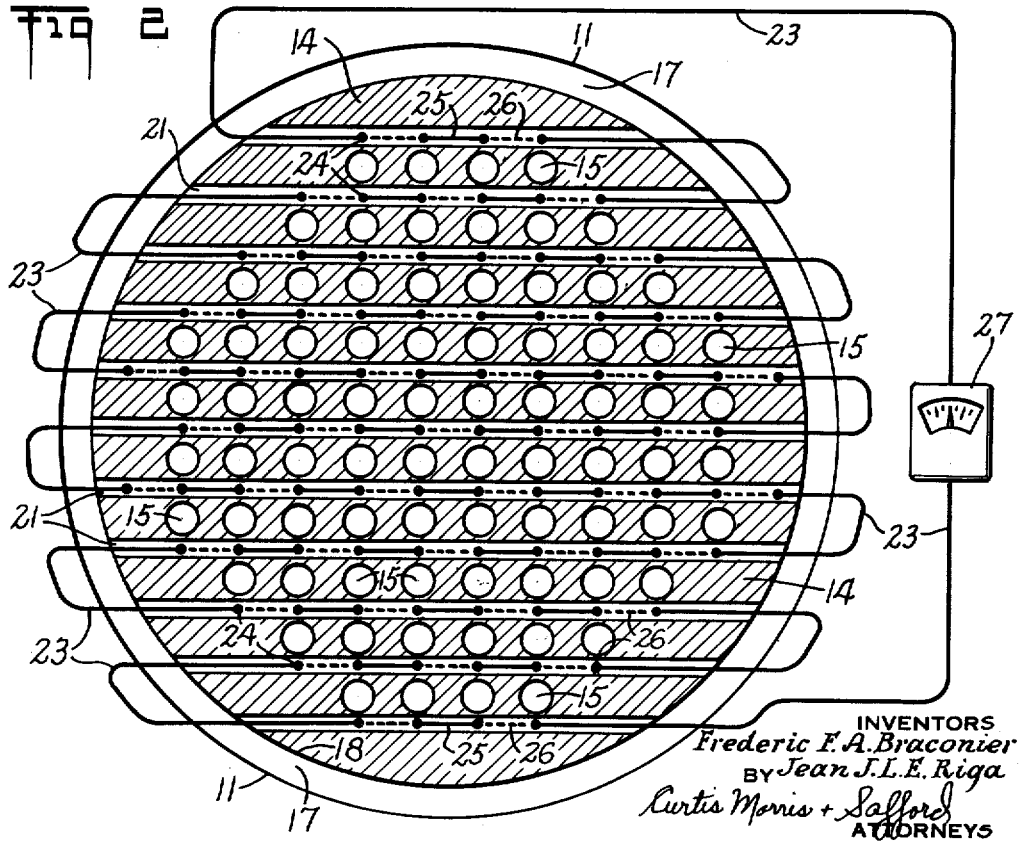

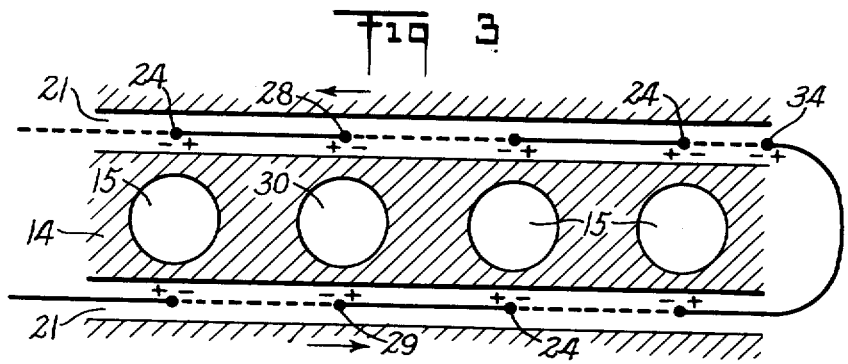
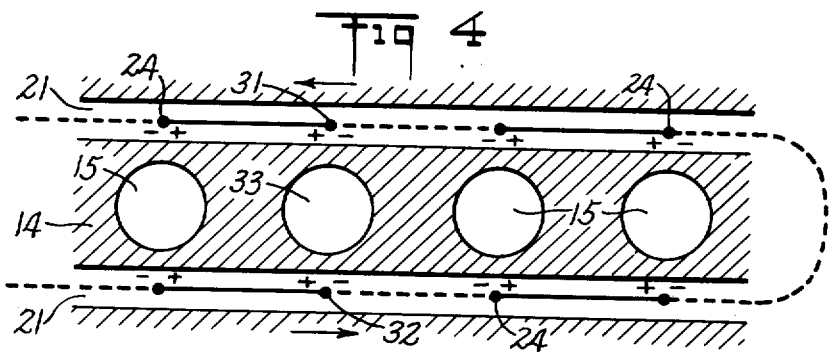
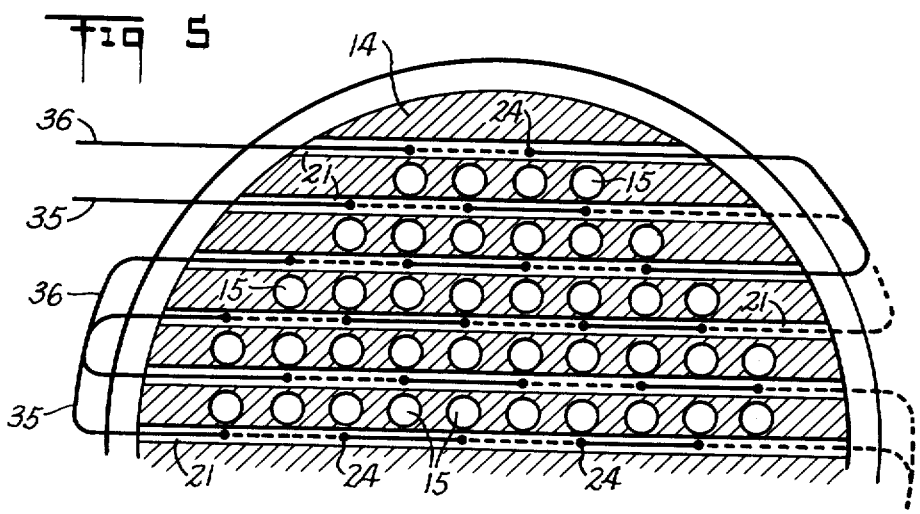

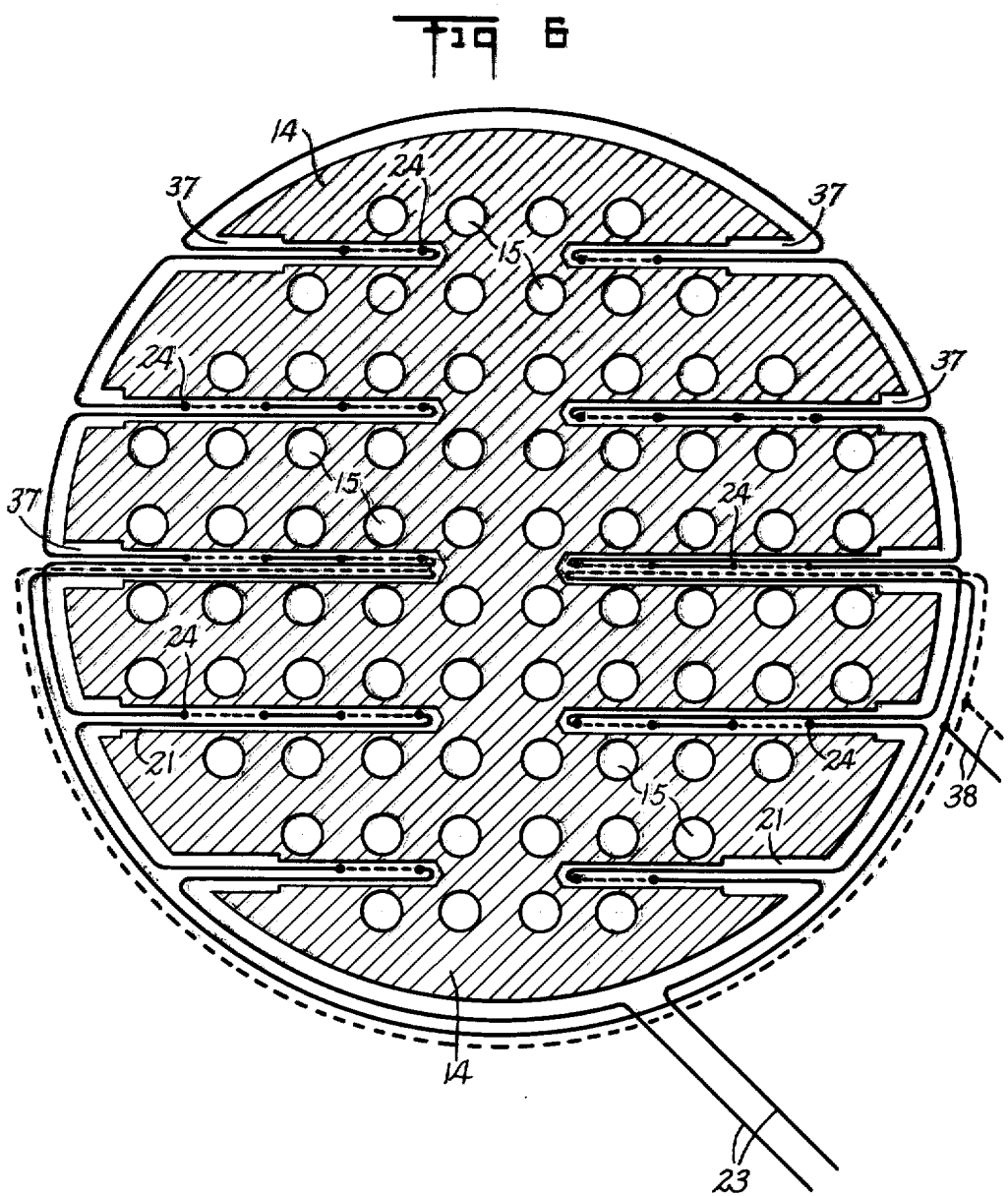

3,061,415
APPARATUS FOR TREATMENT OF
HYDROCARBONS
Frederic F. A. Braconier, Plainevaux, and Jean J. L. E.
Riga, Liege, Belgium, assignors to Societe Belge de
l'Azote et des Produits Chimiques du Marly, Liege,
Belgium
Filed May 27, 1959, Ser. No. 816,106
Claims priority, application Great Britain June 5, 1958
9 Claims. (Cl. 23—277)

This invention relates to a process for monitoring the progress of gas-phase reactions and to apparatus therefor. In particular, this invention relates to a process for monitoring the pyrolysis of hydrocarbon gases and to apparatus therefor.

In the pyrolysis of hydrocarbons, unsaturated hydrocarbons are prepared by thermal treatment of gaseous more-saturated hydrocarbons. The pure products thus produced, such as acetylene, are useful in the synthesis of other organic compounds, for example for making vinyl compounds which can be polymerized to form resins.

The apparatus used for the pyrolysis of hydrocarbons, especially for the preparation of acetylene, advantageously comprises a mixer for mixing the gaseous reactants (e.g. oxygen and gaseous or vaporized hydrocarbon), a reaction chamber connected with the mixer by a gas distributor or gas distribution grid, and means for suddenly cooling the gaseous products produced in the reaction chamber.

In the reaction chamber, a part of the hydrocarbon reactant participates in an exothermic combustion which supplies heat necessary for the endothermic pyrolysis of the remainder of the hydrocarbon. To reduce the consumption of hydrocarbon and oxygen in the exothermic reaction, the gaseous reactants are heated to a high temperature before reaction. This temperature, however, is below that which would cause spontaneous ignition of the oxygen-hydrocarbon mixture during its passage through the mixer. To prevent the flame formed by combustion in the reaction chamber from travelling back through the distributor to the mixer containing the pre-heated mixed reactants (that is, to prevent "flash-back"), the rate of passage of the reactant gases through the distributor is chosen to be greater than the rate of flame propagation in the reaction chamber.

However, unforeseeable factors, such as variations in the flow rate of the reactants or the presence of hot solid particles in the pre-heated reactants, may cause an accidental flash-back and a pre-ignition of the gaseous reactant mixture. To prevent damage or destruction of the distributor and mixer, it is desirable to detect and extinguish this pre-ignition as soon as possible.

Such detection is possible using temperature sensitive instruments, for example a thermocouple, placed in the mixing chamber. In the event of a rise in temperature due to an accidental pre-ignition, the thermocouple can be used to transmit a signal to means, such as a plurality of electro-magnetic relays, controlling the shut-off valves in the reactant feed ducts and other valves for introducing a combustion suppressing gas, such as nitrogen, into the mixing chamber. Copending U.S., application Serial No. 790,568, filed February 2, 1959, describes a detection system of this type.

In certain embodiments of pyrolysis reactors, the design is such as to make the use of a single thermocouple inconvenient. The mixing chamber, for example, may comprise a plurality of smaller chambers, channels, or ducts rather than a single chamber. Each of these ducts may be entrant on one of a plurality of corresponding channels or ducts in the distributor. An embodiment of this type, for example, is described in copending U.S. application Serial No. 664,400, filed June 7, 1957, now Patent No. 2,970,178. By virtue of the large number of channels in such a mixing chamber and the distributor associated therewith, the use of an individual thermocouple and relay device controlling extinguishing means for each mixing and distributing channel is practically unrealizable on an industrial scale.

It is an object of the present invention to rapidly detect pre-ignition in the plural channels of a distributor and mixer.

Another object of the invention is to provide apparatus of simple construction for effecting this detection.

A feature of the present invention is a method of detecting temperature differences using a plurality of thermocouples, in one or more networks, whose electrical outputs are balanced at a substantially null value when the networks are at a uniform temperature, but whose electrical outputs, in case of a temperature difference within the network, are unbalanced and have a value other than a null value.

Another feature of the present invention is a gas distributor comprising therein a plurality of thermocouples, in one or more networks.

According to the present invention, a plurality of thermocouples are connected in series in one or more networks, preferably in one or two networks. Each thermocouple comprises a junction between dissimilar metals. As well known in the art, such a junction is the source of an electromotive force (E.M.F.) or contact potential difference. Each network contains a number of thermocouples connected in series such that the electromotive forces of the individual thermocouple junctions cancel each other when each junction is at the same temperature. This is achieved, for example, when the network comprises an even number of junctions connected in series. However, if one of these junctions is at a temperature different from that of the remaining junctions, its E.M.F. becomes out of balance with the net electromotive force generated by the other junctions. This imbalance can be detected by indicating means, e.g. a potentiometer or galvanometer.

Such a system of thermocouples in one or more networks can be mounted in a gas distributor, for example, with one or more of the thermocouples being associated with one each or more of a plurality of ducts or channels in said distributor. If each channel in the distributor is at the same temperature, no net E.M.F. results. If accidental pre-ignition occurs in one of said channels, resulting in a local temperature anomaly, the anomaly will be detected by the thermocouple associated with the duct. A detectible electrical imbalance occurs, and the resultant net E.M.F. can be detected and automatically recorded, and/or used to initiate an automatic extinction of the pre-ignited combustion.

For a better understanding of the present invention, references can be made to the accompanying drawings, given by way of example. In the drawings, FIG. 1 is a front view, in section, of a portion of an apparatus for the pyrolysis of hydrocarbons;

FIG. 2 is a plan view of the same apparatus, in section taken along the line 2—2 of FIG. 1;

FIG. 3 is a detailed view of a portion of FIG. 2;

FIG. 4 is a detailed view similar to FIG. 3, but which is outside the scope of the present invention and which is included for purposes of comparison.

FIG. 5 is a plan sectional view of a portion of pyrolysis apparatus like that shown in FIG. 2, but which illustrates an embodiment different from that shown in FIG. 2; and FIG. 6 is a plan sectional view of an apparatus for the pyrolysis of hydrocarbons showing still another embodiment of the invention.

In FIG. 1, that portion of the pyrolysis apparatus shown comprises exterior wall 11, conveniently of metal, defining mixing chamber 12 and reaction chamber 16 (only portions of both are shown) respectively above and below distributor 14. Mixing chamber 12 comprises a plurality of channels or ducts 13 which extend through distributor 14 in a corresponding series of extended channels or ducts 15. The lower portions of distributor 14 comprise annular peripheral cavity 17 formed between outer wall 11 and inner wall 18 of distributor 14, and duct 19 entrant on cavity 17. A plurality of transverse passages 21 and 20 (only one of each is visible in FIG. 1) extend into distributor 14 horizontally, the latter passages 20 being connected with reaction chamber 16 through a plurality of apertures 22. Thermocouples (not shown in FIG. 1), joined in series, are introduced into ducts 21.

FIG. 2, a sectional view along line 2—2 of FIG. 1, shows a plurality of ducts 21 which pass transversely through distributor 14 between an array of passages 15 extending between a mixing chamber and reaction chamber. In the figure, network 23 of thermocouples joined in series is threaded through ducts 21 such that there is a pair of thermocouple junctions 24 associated with each of the passages 15. Each junction 24 comprises a joining or welding, advantageously with good physical and electrical contact, between dissimilar metals, which metals are conveniently in the form of wires. In FIG. 2, these wires of dissimilar metals are indicated by representing the wires of one metal, for example nickel, as solid lines 25, and the wires of the dissimilar metal, for example a nickel-chromium alloy, as broken lines 26. In the embodiment shown there is an even number of junctions 24, so that the ends of the wires leading into detecting device 27 are of the same metal. Device 27 detects or measures a potential difference within thermocouple network 23, or, for example, can detect a current flowing through the circuit comprising network 23 and device 27 in network 23.

In the operation of the apparatus shown in part in FIGS. 1 and 2, a hydrocarbon to be pyrolyzed, and oxygen, are separately pre-heated and introduced into ducts 13 in which they mix and flow into channels 15, from which they then flow with uniform distribution into chamber 16. Added oxygen, or pilot oxygen, is fed through duct 19, passing through annular cavity 17 into horizontal passages 20, from whence it is also uniformly distributed into chamber 16 through apertures 22. In chamber 16, the gas mixture present therein is ignited and the pyrolysis reaction takes place.

During normal operation, distributor 14 is at a substantially uniform temperature, because it is uniformly heated by the reaction taking place in chamber 16. The electromotive forces generated by individual thermocouple junctions 24 remain substantially constant and equal to each other. Because of the even number of junctions 24 in network 23, each at the same temperature, the individual E.M.F.'s generated cancel out in pairs. There is thus no net E.M.F. for network 23, and detecting device 27 indicates no net E.M.F. or current. It is advantageous to use, for device 27, a "central zero" device with a needle which can move to either side of an equilibrium or null position reached when distributor 14 is at a substantially uniform temperature.

In the event of pre-ignition in one of channels 15, heating in those portions of distributor 14 surrounding the passage occurs. This heating instantly modifies the contact potential differences of those of junctions 24 associated with the passage, and so creates a potential difference between the ends of the network wires joined to device 27 and activates the device.

Device 27 can be used automatically to set in operation means for initiating extinction of the accidental pre-ignition. For example, in an advantageous embodiment which is particularly sensitive, a condenser is positioned on each side of the "zero" position of the needle. In moving, the needle passes between the plates of one of these condensers, which action transmits an impulse to a relay device. The latter sets in operation, in predetermined order, a system for closing valves in ducts feeding the gaseous reactants and for opening valves to introduce a quenching gas, such as nitrogen.

It can be seen from FIG. 3, showing in detail a portion of FIG. 2, that if two of junctions 24, for example those specifically indicated as 28 and 29 in FIG. 3, are associated with one of channels 15, for example that specific channel numbered 30 in FIG. 3, the polarities of the two junctions are advantageously chosen such that the individual E.M.F.'s generated in case of a pre-ignition occuring in passage 30 are additive. In FIG. 3, the direction of the E.M.F.'s of junctions 28 and 29 are shown by arrows and can be seen to be additive.

If the E.M.F.'s are not additive, as is the case for a pair of junctions 31 and 32 associated with passage 33 of FIG. 4, the E.M.F.'s cancel, and no net E.M.F. in the network could be detected. So that junctions may be paired to give an additive E.M.F., a segment of the network may have an additional junction, such as that indicated as 34 in FIG. 3, not associated with any specific one of the channels 15.

Pre-ignition generally, almost preferentially, occurs in only one of channels 15 of distributor 14. In the unlikely event of pre-ignition occurring at the same instant in each of two adjacent channels, the embodiment shown in FIG. 5 is of particular advantage. This figure shows a portion only of a distributor 14 of the type shown in FIG. 2. However, the embodiment comprises two thermocouple networks 35 and 36 (only one lead of each network is shown) each having a plurality of junctions 24. Each of channels 15 is associated with a junction 24, but adjacent channels are associated with a junction in a different one of the two networks. Each network has a separate detecting device (not shown) associated with it. In case of simultaneous pre-ignition in adjacent apertures, each pre-ignition registers with a thermocouple in a different network and is detected independent of the other pre-ignition.

Still another embodiment of the invention is shown in FIG. 6. This figure shows channels 15 in distributor 14, and a plurality of transverse passages 37 which extend into, but not through, distributor 14. In this embodiment, there is in addition to serially-connected thermocouple network 23, another thermocouple network 38 containing a plurality of junctions not connected in series. The first-mentioned network detects local heating, as previously described. The second network is used to measure the temperature of the distributor as a whole, and is advantageous for detecting an accidental combustion occurring simultaneously in all channels of the distributor. The embodiment shown in FIG. 6 is particularly simple in construction because only one of junctions 24 is associated with four each of channels 15.

It has been observed that, in case of pre-ignition in one of channels 15 of FIGS. 1, 2, 5 and 6, a maximum temperature is observed in the channel at a distance, from that portion of distributor 14 facing reaction chamber 16, of about one-quarter the height of distributor 14 or of the length of passages 15. It is thus advantageous to have transverse passages 21 of FIGS. 1, 2 and 5 and transverse passages 35 of FIG. 6 at about this height in distributor 14. Since transverse passages 21 of FIG. 1 are entrant on annular cavity 17 of that figure, they have flowing through them a current of pilot oxygen, as do ducts 20. This does not impair the effectiveness of the thermocouples in passages 21 in detecting pre-ignition.

It may be helpful for understanding the accompanying figures to give the dimensions of an actual embodiment, like that shown in FIG. 6, which has shown particular usefulness.

Example 1

Distributor 14 is of refractory steel comprising 18 percent of nickel and 8 percent of chromium, stabilized with titanium, and is of the type described in copending U.S. application Serial No. 799,289, filed March 13, 1959. The distributor is combined with a multi-channel mixing device 12, of a type described in copending U.S. application Serial No. 664,400, filed June 7, 1957. Said distributor 14 has a diameter of 270 mm. and comprises 76 channels 15 for the passage of the gaseous reagent mixture. Channels 15 have a diameter of 13 mm. and a height of 250 mm. At approximately 65 mm. in height (measured from the side of the distributor facing combustion chamber 16), ten transverse channels 35 are bored. Said channels are horizontally coplanar, and do not extend completely through the distributor. Channels extending from opposite sides of the distributor oppose each other in pairs. There are two series of five channels, opposing channels of the two series being 40 mm. distant at their closest proximity, and the channels in individual series being 47.5 mm. distant from one another as measured perpendicular to the longitudinal axes of the channels. Thermocouples comprising connected wires of nickel (unbroken line of FIG. 6) and nickel-chromium (broken line of FIG. 6) are introduced into the channels to form a single series-connected network. Homogeneous ends of network 23 are connected to a detecting device measuring the potential difference between the ends.

A second thermocouple network 36 comprising two junctions in parallel is inserted in the middle channels with one junction in each channel.

Although specific embodiments have been herein shown and described, it is to be understood that they are illustrative and not limiting on the scope and spirit of the invention.

We claim:

1. In apparatus for detecting a temperature change in any one of a plurality of channels containing portions of a gas mixture likely to ignite and cause a flash-back, the combination which comprises a plurality of thermocouples for sensing the temperature in said plurality of channels, each of said thermocouples indicating temperature sensed thereby as an electrical potential proportional to said temperature, means for connecting said thermocouples into a circuit for adding said electrical potentials produced thereby, half of said thermocouples being connected into said circuit for impressing thereon a positive potential, and the other half a negative potential, means for measuring the aggregate net balanced potential in said circuit from all said potentials of opposite sign impressed thereon whereby said net balanced potential is substantially zero when the temperatures in all said channels are substantially the same, and means for detecting a change in said net balanced potential as indicating a temperature rise in any one of said channels.

2. Apparatus as recited in claim 1 in which said temperature in each of said channels is sensed by a different one of said plurality of thermocouples, each of which is individually responsive to the temperature in a different one of said channels.

3. Apparatus as recited in claim 1 in which said thermocouples are connected into more than one circuit and in which said thermocouples connected into each said circuit are arranged therein with half of said thermocouples in each said circuit impressing a positive potential thereon and the other half impressing a negative potential thereon.

4. Apparatus as recited in claim 3 in which said thermocouple circuits are disposed among said channels so that the temperatures in adjacent channels are sensed by thermocouples in different said circuits.

5. Apparatus as recited in claim 1 in which each of said plurality of thermocouples senses the temperatures in more than one of said channels.

6. Apparatus as recited in claim 1 in which said circuit of said thermocouples is formed by wiring said thermocouples together in series.

7. Apparatus as recited in claim 6 in which said series circuit of thermocouples is formed by successive lengths of dissimilar metal wires joined together end-to-end to form a series of bi-metallic thermocouple junctures between said successive lengths of wires.

8. Apparatus as recited in claim 1 in which said thermocouples are disposed in passages in the walls of said channels and in temperature-responsive relation to temperature conditions within said channels.

9. Apparatus as recited in claim 1 which also includes means for automatically interrupting flow of said gas mixture to said channels upon said detecting of a temperature rise in any one of said channels.

References Cited in the file of this patent

UNITED STATES PATENTS

| | | |
|---|---|---|
| 1,618,474 | Potter | Feb. 22, 1927 |
| 1,987,642 | Schueler | June 15, 1935 |
| 2,280,353 | Ray | Apr. 21, 1942 |
| 2,351,277 | Mantz | June 13, 1944 |
| 2,482,238 | Betz | Sept. 20, 1949 |
| 2,518,804 | Marvin | Aug. 15, 1950 |
| 2,733,287 | Schauble | Jan. 31, 1956 |
| 2,838,585 | Lehrer | June 10, 1958 |